US012126711B2

(12) United States Patent
Xia et al.

(10) Patent No.: US 12,126,711 B2
(45) Date of Patent: Oct. 22, 2024

(54) METHOD AND DEVICE FOR ENCRYPTION OF VIDEO STREAM, COMMUNICATION EQUIPMENT, AND STORAGE MEDIUM

(71) Applicant: STREAMAX TECHNOLOGY CO., LTD., Guangdong (CN)

(72) Inventors: Jun Xia, Guangdong (CN); Bin Wang, Guangdong (CN); Guoqiang Zheng, Guangdong (CN)

(73) Assignee: STREAMAX TECHNOLOGY CO., LTD., Guangdong (CN)

( * ) Notice: Subject to any disclaimer, the term of this patent is extended or adjusted under 35 U.S.C. 154(b) by 267 days.

(21) Appl. No.: 17/544,528

(22) Filed: Dec. 7, 2021

(65) Prior Publication Data
US 2022/0345292 A1  Oct. 27, 2022

(30) Foreign Application Priority Data
Apr. 27, 2021  (CN) .......................... 202110460904.2

(51) Int. Cl.
*H04L 9/06* (2006.01)
*H04N 21/2347* (2011.01)

(52) U.S. Cl.
CPC ............ *H04L 9/065* (2013.01); *H04L 9/0643* (2013.01); *H04N 21/2347* (2013.01)

(58) Field of Classification Search
CPC ... H04L 9/065; H04L 9/0643; H04L 63/0428; H04N 21/2347; H04N 21/2351; H04N 21/4408
See application file for complete search history.

(56) References Cited

U.S. PATENT DOCUMENTS

| | | | |
|---|---|---|---|
| 8,005,216 B1* | 8/2011 | Agrawal | H04N 21/8456 380/200 |
| 2004/0139336 A1* | 7/2004 | McLean | H04N 21/63345 713/189 |
| 2004/0236956 A1* | 11/2004 | Shen | H04N 21/23476 348/E7.071 |
| 2006/0101287 A1* | 5/2006 | Morten | G11B 20/00086 713/193 |

(Continued)

FOREIGN PATENT DOCUMENTS

| | | |
|---|---|---|
| CN | 106921827 A | 7/2017 |
| CN | 109639691 A | 4/2019 |
| CN | 110363006 A | 10/2019 |

(Continued)

OTHER PUBLICATIONS

Office Action (non-English) dated Nov. 11, 2022; Chinese Application No. 202110460904.2; 9 pages.

*Primary Examiner* — Azizul Choudhury
(74) *Attorney, Agent, or Firm* — CANTOR COLBURN LLP

(57) ABSTRACT

The present application provides a method and a device for encryption of a video stream, a communication equipment, and a storage media. The method for encryption of a video stream includes: acquiring a video stream, encrypting a data part of an I frame by using a first encryption algorithm to obtain a first encrypted data, and encrypting an encryption key of the first encrypted data by using a second encryption algorithm to obtain a second encrypted data, and storing the second encrypted data in a frame header of the I frame to obtain an encrypted I frame.

15 Claims, 3 Drawing Sheets

(56) References Cited

U.S. PATENT DOCUMENTS

2017/0323542 A1* 11/2017 Koh .................... G06F 21/445
2020/0127842 A1   4/2020 Winarski

FOREIGN PATENT DOCUMENTS

| CN | 111277802 | A | 6/2020 |
| CN | 111586442 | A | 8/2020 |
| CN | 112003859 | A | 11/2020 |
| JP | 2020182011 | A | 11/2020 |

* cited by examiner

METHOD AND DEVICE FOR ENCRYPTION OF VIDEO STREAM, COMMUNICATION EQUIPMENT, AND STORAGE MEDIUM

CROSS-REFERENCE TO RELATED APPLICATIONS

Pursuant to 35 U.S.C. § 119 and the Paris Convention, this application claims the benefit of Chinese Patent Application No. 202110460904.2 filed Apr. 27, 2021, the contents of which are incorporated herein by reference.

TECHNICAL FIELD

The present application relates to a field of network security technology, and more particularly to a method and a device for encryption of a video stream, a communication equipment, and a storage media.

BACKGROUND

With continuous development of information technology, network security has received more and more attention. In order to prevent a video stream from being maliciously tampered with, the video stream being transmitted needs to be encrypted. The existing methods for encryption of a video stream are generally complicated to ensure the security of encryption, which results in a slow encryption speed, and cannot take into account the security and efficiency of encryption at the same time.

SUMMARY

In view of this, embodiments of the present application provide a method and a device for encryption of a video stream, a communication equipment, and a storage medium, which can improve the security of encryption while improving the efficiency of video encryption.

The first aspect of the embodiments of the present application provides a method for encryption of a video stream, which includes the following steps: acquiring a video stream, where the video stream includes an I frame; encrypting a data part of the I frame by using a first encryption algorithm to obtain a first encrypted data; encrypting an encryption key of the first encrypted data by using a second encryption algorithm to obtain a second encrypted data, and storing the second encrypted data in a frame header of the I frame to obtain an encrypted I frame.

In an exemplary implementation, the step of encrypting a data part of the I frame by using a first encryption algorithm to obtain a first encrypted data further includes encrypting bytes at a preset position of the data part of the I frame by using the first encryption algorithm to obtain the first encrypted data.

In an exemplary implementation, the video stream further includes a P frame located after the I frame, and after encrypting the encryption key of the first encrypted data by using the second encryption algorithm to obtain the second encrypted data, and storing the second encrypted data in the frame header of the I frame to obtain the encrypted I frame, the method for encryption of a video stream further includes steps of: performing a hash operation on the encrypted I frame to obtain a first hash value; and storing the first hash value in a frame header of the P frame.

In an exemplary implementation, the step of storing the first hash value in a frame header of the P frame further includes: encrypting the first hash value to obtain a third encrypted data; and storing the third encrypted data in the frame header of the P frame.

In an exemplary implementation, a plurality of P frames are provided, and the plurality of P frames are adjacent to each other in sequence, where the step of storing the first hash value in the frame header of the P frame further includes: storing the first hash value in a frame header of the first P frame to update the first P frame; after storing the first hash value in the frame header of the first P frame to update the first P frame, the method for encrypting the video stream further includes cyclically executing the following steps: performing the hash operation on the updated P frame to obtain a second hash value; and storing the second hash value in a frame header of a next P frame to update the next P frame; until the next P frame is the last P frame, performing the hash operation on the updated last P frame to obtain a third hash value.

In an exemplary implementation, the step of storing the second hash value in a frame header of the next P frame further includes: encrypting the second hash value to obtain a fourth encrypted data; and storing the fourth encrypted data in the frame header of the next P frame.

In an exemplary implementation, the first encryption algorithm is an advanced encryption standard encryption algorithm.

The second aspect of the embodiments of the present application provides a device for encryption of a video stream, which includes: an acquisition module configured for acquiring a video stream, where the video stream including a I frame; a first encryption module configured for encrypting a data part of the I frame by to using a first encryption algorithm to obtain a first encrypted data; and a second encryption module configured for encrypting an encryption key of the first encrypted data to by using a second encryption algorithm to obtain a second encrypted data, and storing the second encrypted data in a frame header of the I frame to obtain an encrypted I frame.

In an exemplary implementation, the first encryption module is further configured for encrypting bytes at a preset position of the data part of the I frame by using the first encryption algorithm to obtain the first encrypted data.

In an exemplary implementation, the video stream further includes a P frame located after the I frame, and the device for encryption of a video stream further includes a third encryption module configured for performing a hash operation on the encrypted I frame to obtain a first hash value; and storing the first hash value in a frame header of the P frame.

In an exemplary implementation, the third encryption module is further configured for encrypting the first hash value to obtain a third encrypted data; and storing the third encrypted data in the frame header of the P frame.

In an exemplary implementation, a plurality of P frames are provided, and the plurality of P frames are adjacent to each other in sequence, where the third encryption module is further configured for storing the first hash value in a frame header of the first P frame to update the first P frame; and cyclically executing the following steps: performing the hash operation on the updated P frame to obtain a second hash value; storing the second hash value in a frame header of a next P frame to update the next P frame; until the next P frame is the last P frame, performing the hash operation on the updated last P frame to obtain a third hash value.

In an exemplary implementation, the third encryption module is further configured for encrypting the second hash value to obtain a fourth encrypted data; and storing the fourth encrypted data in the frame header of the next P frame.

In an exemplary implementation, the first encryption algorithm is an advanced encryption standard encryption algorithm.

The third aspect of the embodiments of the present application provides a communication equipment which includes: a memory, a processor, and a computer program stored in the memory and executable on the processor, where the method for encryption of a video stream as described in the first aspect is implemented when the computer program is executed by the processor.

The fourth aspect of the embodiments of the present application provides a computer-readable storage medium storing a computer program, where the method for encryption of a video stream as described in the first aspect is implemented when the computer program is executed by a processor.

The fifth aspect of the embodiments of the present application provides a computer program product, where the computer program product, when runs on a communication equipment, causes the communication equipment to execute the method for encryption of a video stream as described in the first aspect.

Compared with the existing technologies, the embodiments of the present application have the following beneficial effects: by acquiring a video stream, encrypting a data part of the I frame using a first encryption algorithm to obtain a first encrypted data, encrypting an encryption key of the first encrypted data using a second encryption algorithm to obtain a second encrypted data, and storing the second encrypted data in a frame header of the I frame to obtain an encrypted I frame, the security of encryption is improved since the encryption key of the first encrypted data is further encrypted by using the second encryption algorithm after the first encrypted data of the data part of the I frame is obtained; and the efficiency of video encryption can be improved as the second encrypted data obtained after encrypting the encryption key is stored in the frame header of the I frame.

BRIEF DESCRIPTION OF DRAWINGS

In order to describe the technical solutions in the embodiments of the present application more clearly, the following will briefly introduce the drawings that need to be used in the description of the embodiments or the existing technologies.

DETAILED DESCRIPTION OF THE EMBODIMENTS

In the following description, for the purpose of illustration rather than limitation, specific details such as a specific system structure and technology are proposed for a thorough understanding of the embodiments of the present application. However, it should be understood for those skilled in the art that the present application can also be implemented in other embodiments without these specific details. In other cases, detailed descriptions of well-known systems, devices, circuits, and methods are omitted to avoid unnecessary details from obstructing the description of the present application.

In order to illustrate technical solutions in the present application, specific embodiments are provided for description below.

It should be understood that the term "include/comprise" when used in this description and appended claims, indicates the existence of the described features, wholes, steps, operations, elements and/or components, but does not exclude the existence or addition of one or more of other features, wholes, steps, operations, elements, components and/or a collection thereof.

It should also be understood that the terms used in the description of the present application are merely for the purpose of describing specific embodiments and are not intended to limit the present application. As used in the description of the present application and the appended claims, unless the context clearly indicates other circumstances, the singular forms "a", "an" and "the" are intended to include plural forms.

In addition, in the description of the present application, the terms "first", "second", etc. are merely used to distinguish the description, and cannot be understood as indicating or implying relative importance.

The existing methods for encryption of a video stream cannot take into account the security and efficiency of encryption at the same time. For this reason, the present application provides a method for encryption of a video stream, which includes the following steps: acquiring a video stream encrypting a data part of an I frame by using a first encryption algorithm to obtain a first encrypted data; encrypting an encryption key of the first encrypted data by using a second encryption algorithm to obtain a second encrypted data, and storing the second encrypted data in a frame header of the I frame to obtain an encrypted I frame. Since the encryption key of the first encrypted data is further encrypted by using the second encryption algorithm after the first encrypted data of the data part of the I frame is obtained, the security of encryption is improved; and as the second encrypted data obtained after encrypting the encryption key is stored in the frame header of the I frame, the efficiency of video encryption can be improved.

The following is an exemplary embodiment of the method of encryption of a video stream provided by the present application.

Figure 1:
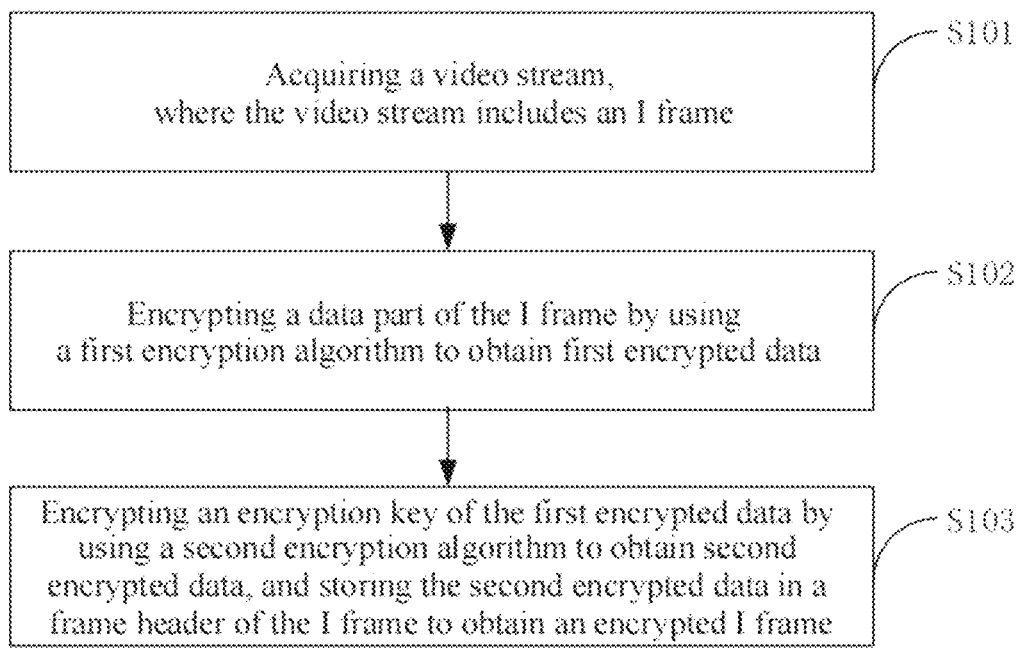
FIG. 1 is a schematic diagram of an implementation process of a method for encryption of a video stream provided by an embodiment of the present application.

Referring to FIG. 1, a method for encryption of a video stream provided by an embodiment of the present application includes:

S101: acquiring a video stream, where the video stream includes an I frame.

In which, the I frame is a key frame in the video stream, and is a first frame of a group of pictures in the video stream. A video stream may include one group of pictures or multiple groups of pictures.

S102: encrypting a data part of the I frame by using a first encryption algorithm to obtain a first encrypted data.

In which, all bytes in the data part of the I frame can be encrypted, or bytes in a preset position of the data part of the I frame can be encrypted. For example, the first 64 bytes of the I frame can be encrypted, or according to a random number generated, the byte corresponding to the random number can be encrypted. Encrypting the bytes at the preset position of the data part of the I frame can reduce the amount of data and improves the efficiency of data transmission while ensuring data security.

The I frame may be encrypted by using a Data Encryption Standard (DES) encryption algorithm or an Advanced Encryption Standard (AES) encryption algorithm. In an exemplary implementation, after the communication equipment is powered on to randomly generate an encryption key of AES256, the first 64 bytes of the I frame is encrypted with the AES256 by using the encryption key of the AES256 to obtain the first encrypted data, and then the first encrypted data is stored in the position of the first 64 bytes of the I frame.

S103: encrypting an encryption key of the first encrypted data by using a second encryption algorithm to obtain a second encrypted data, and storing the second encrypted data in a frame header of the I frame to obtain an encrypted I frame.

In which, the second encryption algorithm and the first encryption algorithm may be the same or different. In an exemplary implementation, the second encryption algorithm is the RSA encryption algorithm. The RSA encryption algorithm includes a public key and a private key. The public key of RSA2048 may be used to encrypt the encryption key of the first encrypted data, and store the obtained second encrypted data in the frame header of the I frame. Since the AES encryption algorithm is a symmetric encryption algorithm, and the RSA encryption algorithm is an asymmetric encryption algorithm, the encryption key of the first encrypted data is re-encrypted, thus increasing the difficulty of decryption and further improving the security of video stream.

If the video stream includes an I frame, after the encrypted I frame is obtained, the video stream can be transmitted. If the video stream includes multiple I frames, the above processing is performed to each I frame to obtain an encrypted video stream, and the video stream is transmitted.

After receiving the video stream, the second encrypted data is firstly decrypted by a receiver according to the private key corresponding to the second encryption algorithm to obtain the encryption key of the first encrypted data, then the first encrypted data is decrypted according to the encryption key of the first encrypted data, and then the decrypted first encrypted data is stored in the position corresponding to the I frame, such that the I frame can be obtained.

In the above embodiment, after the video stream is acquired, the data part of the I frame is encrypted by using the first encryption algorithm to obtain the first encrypted data, the encryption key of the first encrypted data is encrypted by using the second encryption algorithm to obtain the second encrypted data, and the second encrypted data is stored in the frame header of the I frame to obtain the encrypted I frame. Since the encryption key of the first encrypted data is further encrypted by using the second encryption algorithm after the first encrypted data of the data part of the I frame is obtained, the security of encryption is improved; and the second encrypted data obtained after encrypting the encryption key is stored in the frame header of the I frame, the efficiency of video encryption can be improved.

In an exemplary implementation, the video stream includes an I frame and a P frame located after the I frame. The P frame is a difference frame. After the I frame is encrypted, a hash operation is performed on the encrypted I frame (including the frame header and the data part) to obtain a first hash value, and the first hash value is stored in a frame header of the P frame. When decrypting the video stream, the hash value of the decrypted I frame is calculated after the I frame is decrypted. If the hash value of the decrypted I frame is the same as the first hash value, the decrypted I frame is proved to be complete data. If the hash value of the decrypted I frame is different from the first hash value, it is proved that the decrypted I frame is not complete data, so that the integrity of the video can be verified during decryption, thereby preventing the video stream from being tampered with and improving the security of the video stream. In addition, a total of two frames of data of the I frame and the P frame located after the I frame are required to verify the integrity of the video stream, which further improves the security of the video stream.

In an exemplary implementation, after the first hash value is obtained, the first hash value is encrypted to obtain a third encrypted data, and the third encrypted data is stored in a frame header of the P frame. Correspondingly, when decrypting the video stream, first decrypt the third encrypted data to obtain the first hash value, and then determine whether the hash value of the decrypted I frame is the same as the first hash value, which can further improve the security of the video stream.

In other possible implementations, the hash operation may only be performed on the data part of the I frame, or only be performed on the bytes at the preset position of the data part of the I frame, for example, the hash operation may be performed on the first 32 bytes of the data part of the I frame, or performed on the odd-numbered bytes of the I frame.

In which, the encryption algorithm for encrypting the first hash value may be a DES encryption algorithm or an AES encryption algorithm. By using of the AES encryption algorithm, the difficulty of decryption is increased, thereby improving the security of the video stream.

The hash operation may be a Secure Hash Algorithm (SHA) or MD5 message digest algorithm. In an exemplary implementation, the hash operation is performed on the I frame by using the SHA512 or MD5 algorithm to obtain the first hash value, which is a digest of the I frame. The use of a new digest algorithm can solve the digital signature problem of video streams. When video data is used as evidence, a digital signature can provide a valid evidence of court.

In an exemplary implementation, the video stream includes an I frame and a plurality of successively adjacent P frames after the I frame. The hash operation is performed on the I frame to obtain the first hash value. The first hash value is stored in the frame header of the P frame, that is, the first hash value is stored in a frame header of a first P frame to update the first P frame. After storing the first hash value in the frame header of the first P frame to update the first P frame, the following steps are cyclically executed: performing a hash operation on the updated P frame to obtain a second hash value, and storing the second hash value in the frame header of the next P frame to update the next P frame; until the next P frame is the last P frame, performing the hash operation on the updated last P frame to obtain a third hash value. Since the hash operation result of each updated P frame is stored in the frame header of the next P frame, the third hash value obtained is related to each P frame. The third hash value is a chained hash value. Correspondingly, when authenticating the video stream, it is necessary to calculate the hash value of each P frame in the decrypted video stream, and perform an integrity verification of each P frame according to the hash value of each P frame in the decrypted video stream, where the calculation of the hash value of each P frame needs to be compared with the second hash value in the frame header of the next P frame. Therefore, two P frames are required for each integrity verification when authenticating the integrity of the video stream, so that the difficulty of video verification is increased and the security of the video stream is improved.

Specifically, the steps of storing the first hash value in the frame header of the first P frame to obtain the updated first P frame, and performing the hash operation on the updated first P frame to obtain the second hash value of the first P frame further includes: storing the second hash value of the first P frame in the frame header of the second P frame to obtain the updated second P frame, and performing the hash operation on the updated second P frame to obtain the second hash value of the second P frame, and then storing the second hash value of the second P frame in a frame header of the third P frame to obtain the updated third P frame, by analogy, until the last updated P frame is obtained, where each updated P frame includes a frame header and a data part. After the last updated P frame is obtained, the hash operation is performed on the last updated P frame to obtain the third hash value, that is, a chained hash value.

In an exemplary implementation, the hash operation is a message digest algorithm. Correspondingly, the third hash value is the digest of the last updated P frame, and the digest is a digest chain.

In an exemplary implementation, when each second hash value is obtained, the second hash value is encrypted to obtain a fourth encrypted data, and the fourth encrypted data is stored in the frame header of the next P frame to obtain the next updated P frame. Specifically, the method further includes storing the first hash value in the frame header of the first P frame to obtain the updated first P frame, and performing the hash operation on the updated first P frame to obtain the second hash value of the first P frame; encrypting the second hash value of the first P frame to obtain the fourth encrypted data of the first P frame, and storing the fourth encrypted data of the first P frame in the frame header of the second P frame to obtain the updated second P frame, and performing the hash operation on the updated second P frame to obtain the second hash value of the second P frame; encrypting the second hash value of the second P frame to obtain a fourth encrypted data of the second P frame, and then storing the fourth encrypted data of the second P frame in the frame header of the third P frame to obtain the updated third P frame, by analogy, until the frame header of the last updated P frame is obtained, performing the hash operation on the last P frame to obtain the third hash value, thereby improving the security of the video stream.

In another exemplary implementation, after the third hash value is obtained, the third hash value may also be encrypted to obtain an encrypted video stream. Correspondingly, when performing the integrity verification of the video stream, the third hash value is firstly decrypted, and then each second hash value is encrypted in turn, and according to each decrypted second hash value, the integrity verification of video is performed on each P frame in the decrypted video stream, thereby improving the security of the video stream.

In other possible implementations, after the first hash value is obtained and stored in the frame header of the first P frame, it is also possible to perform the hash operation on the frame header of the first P frame and all P frames, and perform the integrity verification of the video based on the obtained hash values. It is also possible to perform the hash operation on the frame header of the first P frame and part of the P frames, and perform the integrity verification of the video based on the obtained hash values. It is also possible to perform the hash operation on the bytes at the preset position of the data part and the frame header of each P frame, and perform the integrity verification of the video based on the obtained hash values.

In an exemplary implementation, the video stream includes multiple I frames, and there are multiple P frames between every two I frames. After performing a video encryption to each I frame and each P frame using the method for encryption of a video stream provided in the above embodiment, the encrypted video stream is obtained.

In an exemplary implementation, after performing a video encryption to the first I frame and all P frames after the first I frame using the method for encryption of a video stream provided in the foregoing embodiment to obtain the third hash value (i.e., a first third hash value), the first third hash value and the encryption key of the first encrypted data of the second I frame may be encrypted and stored in the frame header of the second I frame to obtain the second encrypted I frame. Then the above processing is performed to the P frame after the second I frame to obtain a second third hash value, and then the second third hash value and the encryption key of the first encrypted data corresponding to the third I frame may be encrypted and stored in the frame header of the third I frame to obtain the third encrypted I frame, until the last encrypted I frame is obtained, and then the above processing is performed to the P frames after the last I frame until the third hash value of the last P frame is obtained.

Figure 2:
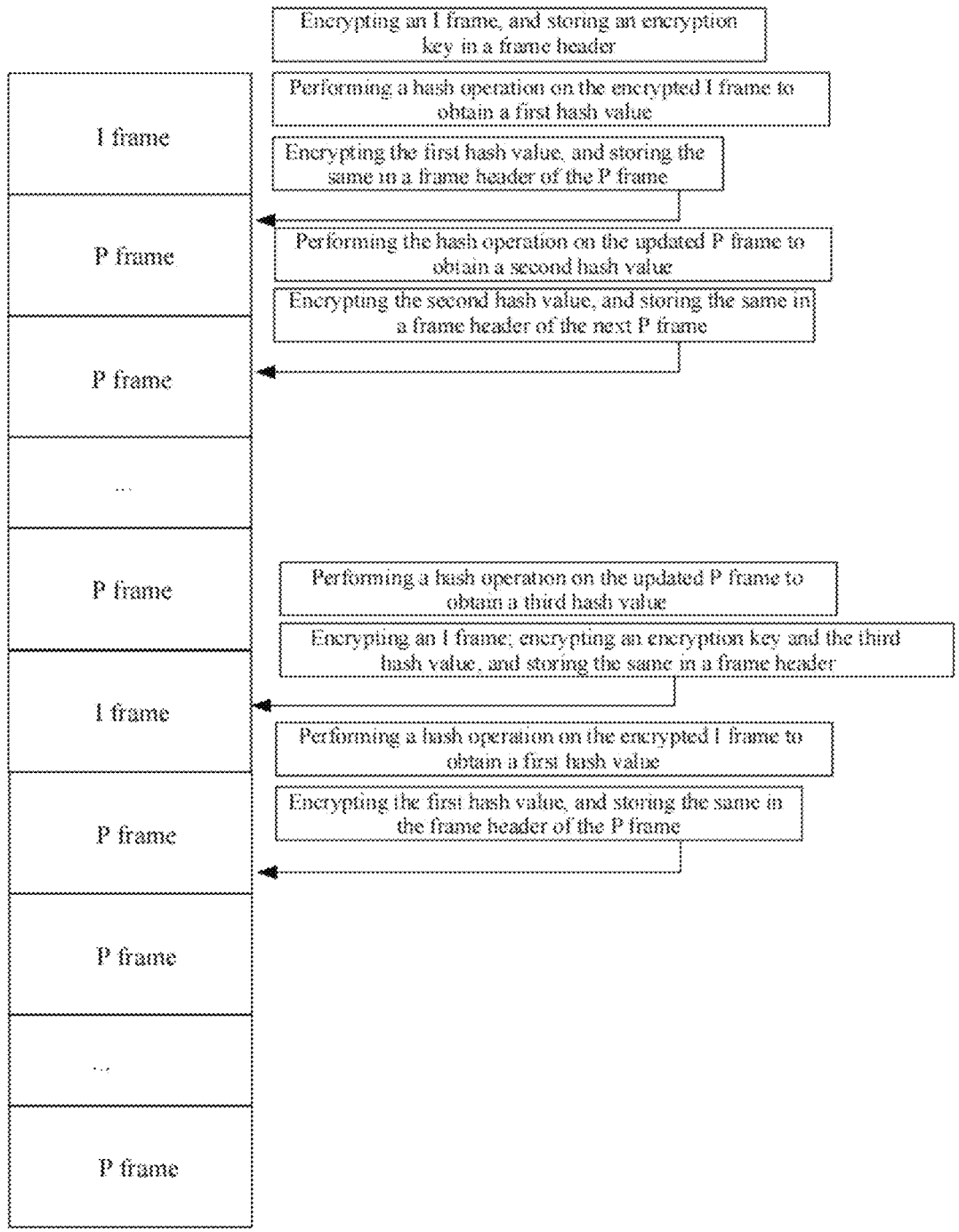
FIG. 2 is a flow chart of a method for encryption of a video stream in an application scenario.

As shown in FIG. 2, in an embodiment, the method for encryption of a video stream may be implemented as follows: after the communication equipment is powered on to randomly generate an encryption key of AES256, and the first 64 bytes of the first I frame is encrypted by using the encryption key of AES256 to obtain the first encrypted data of the first I frame, the encryption key of the first encrypted data of the first I frame are encrypted by using the RSA2048 public key to obtain the second encrypted data, and the second encrypted data is stored in the frame header of the first I frame to obtain the encrypted first I frame. Then the following steps may further be implemented: performing the hash operation on the encrypted first I frame to obtain the first hash value of the first I frame; encrypting the first hash value of the first I frame to obtain the first third encrypted data, and storing the first third encrypted data in the frame header of the first P frame to obtain the updated first P frame; performing the hash operation on the updated first P frame to obtain the second hash value of the first P frame, encrypting the second hash value of the first P frame to obtain the fourth encrypted data of the first P frame, and storing the fourth encrypted data of the first P frame in the frame header of the second P frame to obtain the updated second P frame, by analogy, until the updated P frame before the second I frame is obtained. Then the following steps may further be implemented: performing the hash operation on the updated P frame before the second I frame to obtain the first third hash value; encrypting the second I frame using the same method as applied to the first I frame to obtain the first encrypted data of the second I frame; and encrypting the encryption key of the first encrypted data of the second I frame and the first third hash value, and storing the same in the frame header of the second I frame, and then encrypting the P frame between the second I frame and the third I frame by using the encryption method applied to the above P frame to obtain the second third hash value. By analogy, until the last third hash value is obtained, that is, a chained third hash value. When decrypting a video stream, it is necessary to perform a hash operation on each I frame and each P frame that are decrypted, and perform the integrity verification of the video stream according to the corresponding hash value during encryption, thereby improving the security of the video stream.

It should be understood that the sequence number of each step in the foregoing embodiment does not mean the sequence of execution. The execution sequence of each process should be determined by its function and internal logic, and should not constitute any limitation on the implementation processes of the embodiments of the present application.

Figure 3:
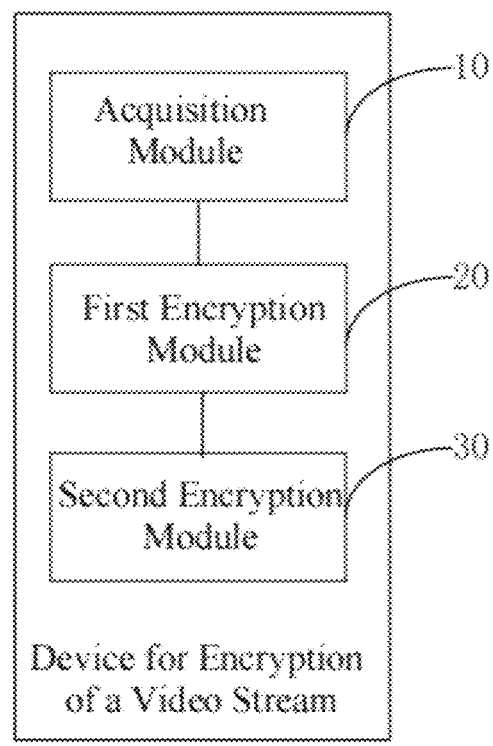
FIG. 3 is a schematic diagram of a device for a video stream encryption provided by an embodiment of the present application.

Corresponding to the method for encryption of a video stream described in the above embodiment, FIG. 3 shows a structural block diagram of a device for encryption of a video stream provided in an embodiment of the present application. For ease of description, only the information related to the embodiment of the present application is shown.

As shown in FIG. 3, the device for encryption of a video stream includes:
- an acquisition module 10 which is configured to obtain a video stream, where the video stream includes an I frame;
- a first encryption module 20 which is configured to encrypt data part of the I frame using a first encryption algorithm to obtain a first encrypted data;
- a second encryption module 30 which is configured to encrypt an encryption key of the first encrypted data using a second encryption algorithm to obtain a second encrypted data, and to store the second encrypted data in a frame header of the I frame to obtain an encrypted I frame.

In an exemplary implementation, the first encryption module 20 is specifically configured to encrypt bytes at a preset position of the data part of the I frame by using the first encryption algorithm to obtain the first encrypted data.

In an exemplary implementation, the video stream further includes a P frame located after the I frame, and the device for encrypting the video stream further includes a third encryption module which is configured to perform a hash operation on the encrypted I frame to obtain a first hash value; and store the first hash value in a frame header of the P frame.

In an exemplary implementation, the third encryption module is configured to encrypt the first hash value to obtain a third encrypted data; and store the third encrypted data in the frame header of the P frame.

In an exemplary implementation, the number of the P frames is multiple, and the multiple P frames are adjacent to each other in sequence, where the third encryption module is specifically configured to store the first hash value in the frame header of the first P frame to update the first P frame; and to cyclically execute the following steps: performing the hash operation on the updated P frame to obtain a second hash value; storing the second hash value in a frame header of the next P frame to update the next P frame; and until the next P frame is the last P frame, performing the hash operation on the updated last P frame to obtain a third hash value.

In an exemplary implementation, the third encryption module is further configured to encrypt the second hash value to obtain a fourth encrypted data; and store the fourth encrypted data in a frame header of the next P frame.

In an exemplary implementation, the first encryption algorithm is an advanced encryption standard encryption algorithm.

It should be noted that the information interaction and execution process between the above-mentioned devices/ units are based on the same concept as the method embodiment of the present application, and its specific functions and technical effects can be found in sections of the method embodiments, which will not be repeated here.

Figure 4:
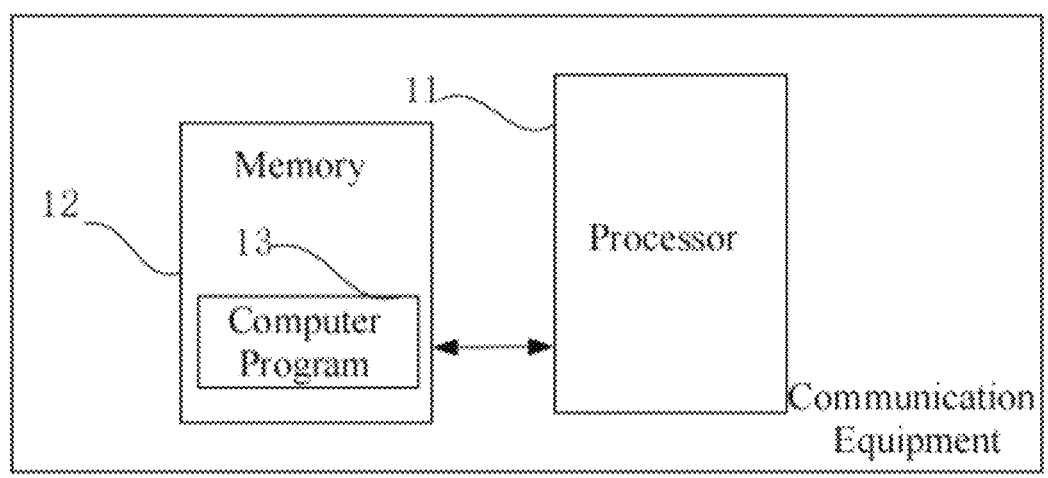
FIG. 4 is a schematic diagram of a communication equipment provided by an embodiment of the present application.

FIG. 4 is a schematic diagram of a communication equipment provided by an embodiment of the present application. As shown in FIG. 4, the communication equipment of this embodiment includes a processor 11, a memory 12, and a computer program 13 stored in the memory 12 and executable on the processor 11. When the computer program 13 is executed by the processor 11, the steps in the method for encryption of a video stream encryption provided in the foregoing embodiment are implemented, such as steps S101 to S104 shown in FIG. 1. Alternatively, when the computer program 13 is executed by the processor 11, the functions of the modules/units in the foregoing device embodiments are implemented, for example, the functions of the acquisition module 10, the first encryption module 20 and the second encryption module 30 shown in FIG. 3.

Exemplarily, the computer program 13 may be divided into one or more modules/units, and the one or more modules/units are stored in the memory 12 and executed by the processor 11 to complete the present application. The one or more modules/units may be a series instruction segments of computer program capable of completing specific functions, and the instruction segments are used to describe the execution process of the computer program 13 in the communication equipment.

The communication equipment may be a computing device such as a desktop computer, a notebook, a palmtop computer, and a cloud server. It should be understood for those skilled in the art that FIG. 4 is only an example of a communication equipment, and does not constitute a limitation thereto. It may include more or less components than those shown in the figure, or a combination of certain components, or different components, for example, the communication equipment may also include input and output devices, network access devices, buses, and so on.

The processor 11 may be a Central Processing Unit (CPU), and may also be other general-purpose processors, Digital Signal Processors (DSP), Application Specific Integrated Circuits (ASIC), Field-Programmable Gate Arrays (FPGA) or other programmable logic devices, discrete gates or transistor logic devices, discrete hardware components, etc. The general-purpose processor may be a microprocessor or the processor may also be any conventional processor or the like.

The memory 12 may be an internal storage unit of the communication equipment, such as a hard disk or a memory of the communication equipment. The memory 12 may also be an external storage device of the communication equipment, such as a plug-in hard disk, a Smart Media Card, (SMC), a Secure Digital (SD) card, or a Flash Card, etc. equipped on the communication equipment. Furthermore, the memory 12 may also include both an internal storage unit and an external storage device of the communication equipment. The memory 12 is used to store the computer program and other programs and data required by the communication equipment. The memory 12 can also be used to temporarily store data that has been output or will be output.

In the above-mentioned embodiments, the description of each embodiment has its own emphasis. For parts that are not described in detail or recorded in an embodiment, reference may be made to related descriptions of other embodiments.

Those skilled in the art can clearly understand that for the convenience and conciseness of description, only the division of the above-mentioned functional units and modules is used as an example. In practical applications, the above-mentioned functions can be allocated to different functional units and modules to complete as required, that is, the internal structure of the device may be divided into different functional units or modules to complete all or part of the functions described above. The functional units and modules in the embodiments can be integrated in one processing unit, or each unit can exist alone physically, or two or more units can be integrated in one unit. The above integrated units can be implemented in the form of hardware or software functional units. In addition, the specific names of the functional units and modules are only for the convenience of distinguishing each other, and are not used to limit the protection scope of the present application. For the specific working process of the units and modules in the foregoing system, reference may be made to the corresponding process in the foregoing method embodiment, which will not be repeated here.

The units described as separate components may or may not be physically separated, and the components shown as units may or may not be physical units, that is, they may be located in one place, or they may be distributed on multiple network units. Some or all of the units may be selected according to actual needs to achieve objectives of technical solutions of the embodiments.

If the integrated module/unit is implemented in the form of a software functional unit and sold or used as an independent product, it can be stored in a computer readable storage medium. Based on this understanding, the present application implements all or part of the processes in the above-mentioned method embodiments, and can also be completed by instructing relevant hardware through a computer program. The computer program can be stored in a computer-readable storage medium. When the program is executed by the processor, it can implement the steps of the foregoing method embodiments. Among them, the computer program includes computer program code, and the computer program code may be in the form of source code, object code, executable file, or in some intermediate forms. The computer-readable medium may include: any entity or device capable of carrying the computer program code, such as recording medium, U disk, mobile hard disk, magnetic disk, optical disk, computer memory, Read-Only Memory (ROM), Random Access Memory (RAM), electrical carrier signal, telecommunications signal, and software distribution media, etc.

The embodiments disclosed herein are merely used to illustrate the technical solutions of the present application, but not intended to limit the present application. Although the present application is described in detail with reference to the foregoing embodiments, it should be understood for persons skilled in the art that modifications, or equivalent replacements of some of the technical features can be implemented under the spirit of the present application, and these modifications or replacements do not deviate the essence of the corresponding technical solutions from the spirit and scope of the technical solutions of the embodiments of the present application, and should be included in the protection scope of the present application.

What is claimed is:

1. A method for encryption of a video stream, comprising:
   acquiring a video stream, the video stream comprising an I frame;
   encrypting a data part of the I frame by using a first encryption algorithm to obtain first encrypted data; and
   encrypting an encryption key of the first encrypted data by using a second encryption algorithm to obtain second encrypted data, and storing the second encrypted data in a frame header of the I frame to obtain an encrypted I frame,
   wherein the video stream further comprises a P frame located after the I frame, and after encrypting the encryption key of the first encrypted data by using the second encryption algorithm to obtain the second encrypted data, and storing the second encrypted data in the frame header of the I frame to obtain the encrypted I frame, the method for encryption of a video stream further comprises:
   performing a hash operation on the encrypted I frame to obtain a first hash value; and
   storing the first hash value in a frame header of the P frame,
   wherein a plurality of P frames are provided, and the plurality of P frames are adjacent to each other in sequence, and wherein the storing the first hash value in a frame header of the P frame comprises:
   storing the first hash value in a frame header of a first P frame to update the first P frame; and
   after storing the first hash value in the frame header of the first P frame to update the first P frame, the method for encrypting the video stream further comprises cyclically executing the following steps:
   performing the hash operation on an updated P frame to obtain a second hash value;
   storing the second hash value in a frame header of a next P frame to update the next P frame; and
   until the next P frame is the last P frame, performing the hash operation on an updated last P frame to obtain a third hash value.

2. The method for encryption of a video stream according to claim 1, wherein the encrypting a data part of the I frame using a first encryption algorithm to obtain a first encrypted data comprises:
   encrypting bytes at a preset position of the data part of the I frame by using the first encryption algorithm to obtain the first encrypted data.

3. The method for encryption of a video stream according to claim 1, wherein the storing the first hash value in the frame header of the P frame comprises:
   encrypting the first hash value to obtain third encrypted data; and
   storing the third encrypted data in the frame header of the P frame.

4. The method for encryption of a video stream according to claim 1, wherein the storing the second hash value in a frame header of a next P frame comprises:
   encrypting the second hash value to obtain a fourth encrypted data; and
   storing the fourth encrypted data in the frame header of the next P frame.

5. The method for encryption of a video stream according to claim 1, wherein the first encryption algorithm is an advanced encryption standard encryption algorithm.

6. A communication equipment, comprising a memory, a processor, and a computer program stored in the memory and executable on the processor, wherein the processor, by executing the computer program, is configured to:
   acquire a video stream, the video stream comprising an I frame;

encrypt a data part of the I frame by using a first encryption algorithm to obtain first encrypted data; and encrypt an encryption key of the first encrypted data by using a second encryption algorithm to obtain second encrypted data, and storing the second encrypted data in a frame header of the I frame to obtain an encrypted I frame, wherein the video stream further comprises a P frame located after the I frame, and after encrypting the encryption key of the first encrypted data by using the second encryption algorithm to obtain the second encrypted data, and storing the second encrypted data in the frame header of the I frame to obtain the encrypted I frame, the method for encryption of a video stream further comprises:

performing a hash operation of the encrypted I frame to obtain a first hash value; and storing the first hash value in a frame header of the P frame, wherein a plurality of P frames are provided, and the plurality of P frames are adjacent to each other in sequence, and wherein the storing the first hash value in a frame header of the P frame comprises:

storing the first hash value in a frame header of a first P frame to update the first P frame; and after storing the first hash value in the frame header of the first P frame to update the first P frame, the method for encrypting the video stream further comprises cyclically executing the following steps:

performing the hash operation on an update P frame to obtain a second hash value;

storing the second hash value in a frame header of a next P frame to update the next P frame; and until the net P frame is the last P frame, performing the hash operation on an updated last P frame to obtain a third hash value.

7. The communication equipment according to claim 6, wherein the operation of encrypting a data part of the I frame using a first encryption algorithm to obtain a first encrypted data comprises:

encrypting bytes at a preset position of the data part of the I frame by using the first encryption algorithm to obtain the first encrypted data.

8. The communication equipment according to claim 6, wherein the operation of storing the first hash value in the frame header of the P frame comprises:

encrypting the first hash value to obtain third encrypted data; and storing the third encrypted data in the frame header of the P frame.

9. The communication equipment according to claim 6, wherein the operation of storing the second hash value in a frame header of a next P frame comprises:

encrypting the second hash value to obtain a fourth encrypted data; and storing the fourth encrypted data in the frame header of the next P frame.

10. The communication according to claim 6, wherein the first encryption algorithm is an advanced encryption standard encryption algorithm.

11. A non-transitory computer-readable storage medium storing a computer program, wherein the computer program, executable by a processor, cause the processor to perform operations that comprises:

acquiring a video stream, the video stream comprising an I frame;

encrypting a data part of the I frame by using a first encryption algorithm to obtain first encrypted data; and encrypting an encryption key of the first encrypted data by using second encryption algorithm to obtain a second encrypted data, and storing the second encrypted data in a frame header of the I frame to obtain an encrypted I frame, wherein the video stream further comprises a P frame located after the I frame, and after encrypting the encryption key of the first encrypted data by using the second encryption algorithm to obtain the second encrypted data, and storing the second encrypted data in the frame header of the I frame to obtain the encrypted I frame, the method for encryption of a video stream further comprises:

performing a hash operation on the encrypted I frame to obtain a first hash value; and storing the first hash value in a frame header of the P frame, wherein a plurality of P frames are provided, and the plurality of P frames are adjacent to each other in sequence, and wherein the storing the first hash value in a frame header of the P frame comprises:

storing the first hash value in a frame header of a first P frame to update the first P frame; and after storing the first hash value in the frame header of the first P frame to update the first P frame, the method for encrypting the video stream further comprises cyclically executing the following steps:

performing the hash operation on an updated P frame to obtain a second hash value;

storing the second hash value in a frame header of a next P frame to update the next P frame; and until the next P frame is the last P frame, performing the hash operation on an updated last P frame to obtain a third hash value.

12. The non-transitory computer-readable storage medium according to claim 11, wherein the operation of encrypting a data part of the I frame using a first encryption algorithm to obtain a first encrypted data comprises:

encrypting bytes at a preset position of the data part of the I frame by using the first encryption algorithm to obtain the first encrypted data.

13. The non-transitory computer-readable storage medium according to claim 11, wherein the operation of storing the first hash value in the frame header of the P frame comprises:

encrypting the first hash value to obtain third encrypted data; and storing the third encrypted data in the frame header of the P frame.

14. The non-transitory computer-readable storage medium according to claim 11, wherein the operation of storing the second hash value in a frame header of a next P frame comprises:

encrypting the second hash value to obtain a fourth encrypted data; and storing the fourth encrypted data in the frame header of the next P frame.

15. The non-transitory computer-readable storage medium according to claim 11, wherein the first encryption algorithm is an advanced encryption standard encryption algorithm.

* * * * *